United States Patent
Moran et al.

(10) Patent No.: US 12,492,901 B2
(45) Date of Patent: Dec. 9, 2025

(54) MULTI-MODE, MODE-MATCHED, MEMS-BASED CORIOLIS VIBRATORY GYROSCOPE

(71) Applicant: The United States of America as represented by the Secretary of the Navy, San Diego, CA (US)

(72) Inventors: Kari Moran, San Diego, CA (US); Kathryn Liotta, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 339 days.

(21) Appl. No.: 18/164,739

(22) Filed: Feb. 6, 2023

(65) Prior Publication Data

US 2024/0263944 A1    Aug. 8, 2024

(51) Int. Cl.
*G01C 19/5712* (2012.01)
*G01C 19/5614* (2012.01)
*G01C 19/5783* (2012.01)

(52) U.S. Cl.
CPC ..... *G01C 19/5712* (2013.01); *G01C 19/5614* (2013.01); *G01C 19/5783* (2013.01)

(58) Field of Classification Search
None
See application file for complete search history.

(56) References Cited

U.S. PATENT DOCUMENTS

| | | | |
|---|---|---|---|
| 6,196,067 B1 * | 3/2001 | Martin | G01P 15/125 |
| | | | 73/514.32 |
| 9,726,489 B2 | 8/2017 | Ayazi et al. | |
| 9,810,535 B2 | 11/2017 | Trusov et al. | |

(Continued)

OTHER PUBLICATIONS

I. P. Prikhodko et al., "Mode-matched MEMS Coriolis vibratory gyroscopes: Myth or reality?," 2016 IEEE/ION Position, Location and Navigation Symposium (PLANS), 2016, pp. 1-4, doi: 10.1109/PLANS.2016.7479674.

(Continued)

*Primary Examiner* — Mark A Shabman
(74) *Attorney, Agent, or Firm* — Naval Information Warfare Center Pacific; Kyle Eppele

(57) ABSTRACT

A multi-mode, mode-matched, mems-based Coriolis vibratory gyroscope. A vibratory gyroscope apparatus, comprising a resonating proof mass having a top surface and a plurality of side surfaces substantially perpendicular to the top surface, wherein the proof mass is configured to facilitate in-plane motion at a mode-matched frequency, a plurality of comb capacitors, each coupled to one of the plurality of side surfaces, and configured to provide an in-plane sense metric while operating at the mode-matched frequency, and a plurality of serpentine springs configured to facilitate translational motion of the proof mass in directions substantially perpendicular to the top surface. Additionally, the apparatus may further comprise a gyroscope controller configured to receive, measure, and/or adjust the control signal for a plurality of sense modes, an actuator electrically coupled to the proof mass, and a plurality of electrodes each electrically coupled to each of the plurality of comb capacitors.

1 Claim, 8 Drawing Sheets
(5 of 8 Drawing Sheet(s) Filed in Color)

(56) References Cited

U.S. PATENT DOCUMENTS

| | | | | |
|---|---|---|---|---|
| 2006/0032308 A1* | 2/2006 | Acar | ............... | G01C 19/5719 73/504.12 |
| 2010/0313657 A1* | 12/2010 | Trusov | ............... | G01C 19/5747 73/504.16 |
| 2014/0208823 A1* | 7/2014 | Trusov | ............... | G01P 15/125 73/1.38 |
| 2016/0084654 A1* | 3/2016 | Senkal | ............... | G01C 19/5747 73/504.12 |
| 2016/0139176 A1* | 5/2016 | Shirazi | ............... | G01C 19/5726 73/1.38 |
| 2018/0180418 A1* | 6/2018 | Estes | ............... | E21B 49/003 |
| 2019/0277656 A1* | 9/2019 | Painter | ............... | G01C 25/005 |
| 2020/0096536 A1* | 3/2020 | Zou | ............... | G01P 21/00 |
| 2020/0124419 A1* | 4/2020 | Barbul | ............... | G01P 15/18 |
| 2020/0363205 A1* | 11/2020 | Gando | ............... | G01C 19/5755 |
| 2022/0057208 A1* | 2/2022 | Prikhodko | ............... | G01C 19/5712 |

OTHER PUBLICATIONS

D. Roy J. H. Klootwijk, N. A. M. Verhaegh, H. H. A. J. Roosen and R. A. M. Wolters, "Comb Capacitor Structures for On-Chip Physical Uncloneable Function," in IEEE Transactions on Semiconductor Manufacturing, vol. 22, No. 1, pp. 96-102, Feb. 2009, doi: 10.1109/TSM.2008.2010738.

* cited by examiner

/ 70

```
providing a vibratory gyroscope, further comprising a resonating proof mass having a top
   surface and a plurality of side surfaces substantially perpendicular to the top surface,
   wherein the proof mass is configured to facilitate in-plane motion at a mode-matched
   frequency; a plurality of comb capacitors, each coupled to one of the plurality of side
surfaces, and configured to provide an in-plane sense metric while operating at the mode-
    matched frequency; and a plurality of serpentine springs configured to facilitate
   translational motion of the proof mass in directions substantially perpendicular to the top
                                         surface
``` driving the proof mass with a mode-matched drive signal in a first orthogonal direction supplying the plurality of comb capacitors and the proof mass with a mode-matched control signal monitoring a vibrometer for vibration in the proof mass monitoring the plurality of comb capacitors for changes in vibration determining a inertial rotation rates by integrating the sense metric over time calculating sensor orientation in three orthogonal directions

Fig. 7

MULTI-MODE, MODE-MATCHED, MEMS-BASED CORIOLIS VIBRATORY GYROSCOPE

STATEMENT REGARDING FEDERALLY-SPONSORED RESEARCH AND DEVELOPMENT

The United States Government has ownership rights in this invention. Licensing inquiries may be directed to Office of Research and Technical Applications Naval Information Warfare Center Pacific, Code 72120, San Diego, CA, 92152; telephone (619) 553-5118; email: niwc_patent.fct@us.navy.mil, referencing Navy Case 112,883.

BACKGROUND

Inertial sensors are increasingly utilized for recognizing and measuring multi-dimensional motion. In their simplest configuration, inertial sensors measure a single force and direction. Advancements in the field have produced vibratory gyroscopes that leverage the Coriolis Effect to accurately measure angular rotation in multiple dimensions. This requires multiple sensors to track the linear accelerations and angular rotations about three different axes and may be used, for example, in inertial navigation. Similarly, platform stabilization requires angular rotation information for both pitch & yaw directions, which would require either multiple sensors, or multiple devices with different sensitivities to each direction. There is a continual desire to make vibratory gyroscopes smaller and lighter.

SUMMARY

According to illustrative embodiments, this disclosure comprises a multi-mode, mode-matched, mems-based Coriolis vibratory gyroscope. A vibratory gyroscope apparatus comprising a resonating proof mass having a top surface and a plurality of side surfaces substantially perpendicular to the top surface, wherein the proof mass is configured to facilitate in-plane motion at a mode-matched frequency, a plurality of comb capacitors, each coupled to one of the plurality of side surfaces, and configured to provide an in-plane sense metric while operating at the mode-matched frequency, and a plurality of serpentine springs configured to facilitate translational motion of the proof mass in directions substantially perpendicular to the top surface. Additionally, vibratory gyroscope apparatus further comprising a gyroscope controller configured to receive, measure, and/or adjust the control signal for a plurality of sense modes, an actuator electrically coupled to the proof mass configured to apply the periodic oscillatory signal, and a plurality of electrodes each electrically coupled to each of the plurality of comb capacitors.

Additionally, a method of collecting inertial sensor information comprising the step of providing a vibratory gyroscope, further comprising a resonating proof mass having a top surface and a plurality of side surfaces substantially perpendicular to the top surface, wherein the proof mass is configured to facilitate in-plane motion at a mode-matched frequency; a plurality of comb capacitors, each coupled to one of the plurality of side surfaces, and configured to provide an in-plane sense metric while operating at the mode-matched frequency; and a plurality of serpentine springs configured to facilitate translational motion of the proof mass in directions substantially perpendicular to the top surface; driving the proof mass with a mode-matched drive signal in a first orthogonal direction; supplying the plurality of comb capacitors and the proof mass with a mode-matched control signal; monitoring a vibrometer for vibration in the proof mass; monitoring the plurality of comb capacitors for changes in vibration; determining a inertial rotation rates by integrating the sense metric over time; calculating sensor orientation in three orthogonal directions.

It is an object to provide a multi-mode, mode-matched, micro-electro-mechanical system (MEMS) based, Coriolis vibratory gyroscope that offers numerous benefits, including providing consistent sensitivity in at least two orthogonal directions, relieving the number of sensors used and/or limitations from various direction sensitivities.

Furthermore, operating a sensor with multiple sensitive axes allows for miniaturization and decreased cost due to fewer fabricated parts. Operating both sense modes in a mode-matched operation, allows for improved detection of angular inertia. Each of these have been implemented in MEMS-based Coriolis vibratory gyroscopes, but have not been implemented simultaneously.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and form a part of the specification, illustrate example embodiments and, together with the description, serve to explain the principles of the invention. Throughout the several views, like elements are referenced using like references. The elements in the figures are not drawn to scale and some dimensions are exaggerated for clarity. In the drawings:

FIG. 7 is block-diagram illustration of a method of collecting inertial sensor information comprising the step of providing a vibratory gyroscope.

DETAILED DESCRIPTION OF EMBODIMENTS

Figure 1:
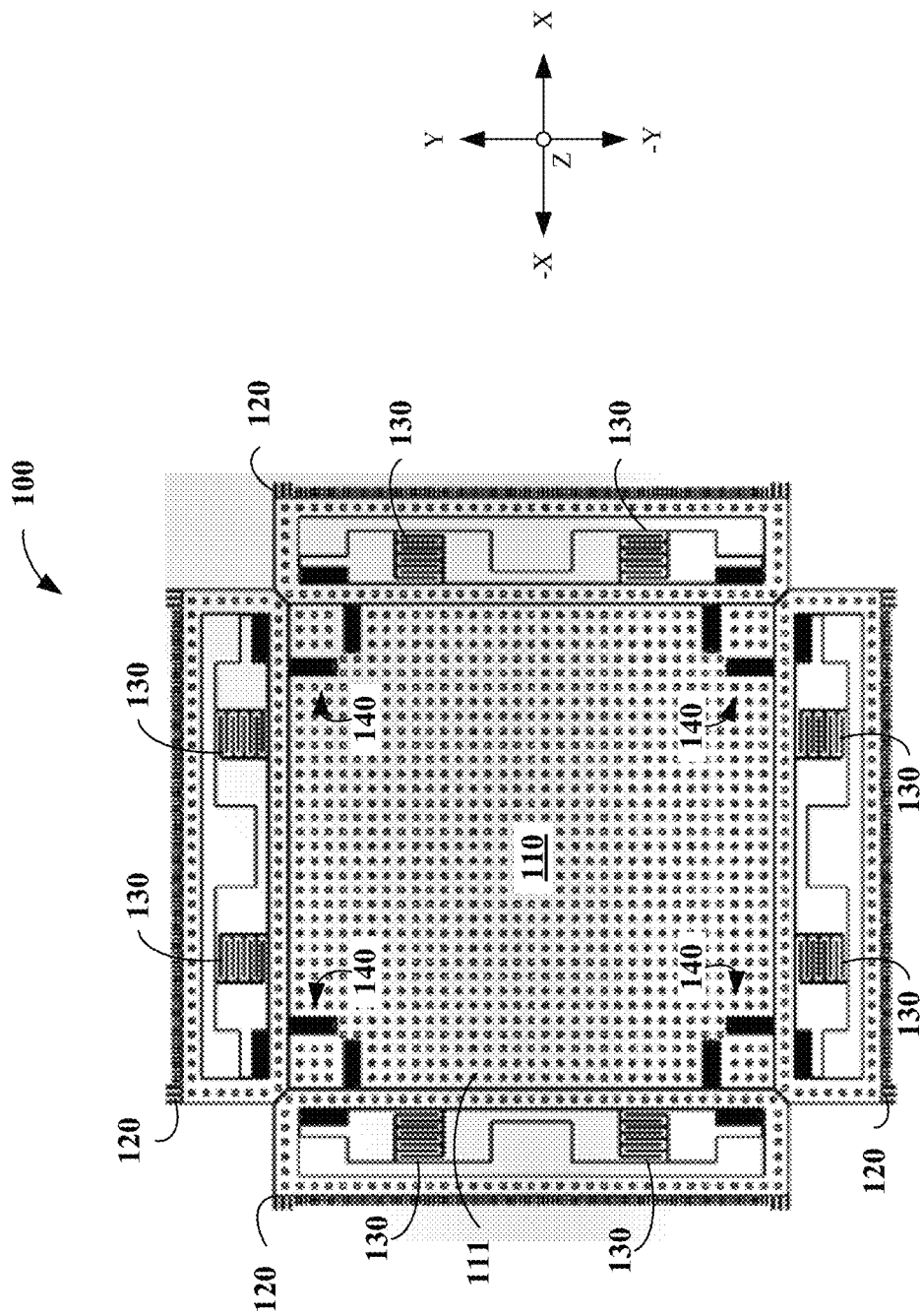
FIG. 1 is a top-view illustration of a vibratory gyroscope apparatus.

The disclosed apparatus, system, and method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other apparatus, system, and method described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

This disclosure relates generally to inertial sensor systems and MEMS-based Coriolis vibratory gyroscopes. More specifically, a MEMS-based Coriolis vibratory gyroscope 100 that may function in a mode-matching operation, as opposed to a mode-split operation. A mode-matching operation utilizes the same frequency for both drive and sense modes, while mode-split operations intentionally mismatch the drive and sense modes. Mismatching prioritizes gain stability and allows for a wide bandwidth, but sacrifices the noise density. Operating a MEMS-based Coriolis vibratory gyroscope 100 in mode-matching operation improves noise performance, increases sensitivity to angular inertia, and reduces redundant. Improved noise performance, in particular, is desirable in MEMS-based Coriolis vibratory gyroscope because it reduces potential error from physical motion incurred by the device or system being monitored for inertial motion.

Moreover, this disclosure relates to multi-mode, MEMS-based Coriolis vibratory gyroscope 100 that measure angular rotation in multiple orthogonal directions. For example, the vibratory gyroscope apparatus or system described here may be driven at resonance in a drive mode 10 and allow for induced motion in at least two additional orthogonal directions. Collectively, this allows for tracking linear accelerations and angular rotations about three or more orthogonal directions. Because common MEMS-based gyroscopes on the market today track accelerations and rotations about only one or two axes, tracking three axes with one device reduces the need for multiple sets of electronics. Such applications of multi-mode gyroscopes include platform stabilization and inertial navigation systems, but are not so limited.

FIG. 1 is a top-view illustration of a vibratory gyroscope apparatus comprising a proof mass 110, plurality of comb capacitors 120, plurality of serpentine springs 130, and plurality of anchors 140. Each of these elements comprise silicon, and may further comprise electrodes made of conductive metal to provide connections throughout the packaging. A vibratory gyroscope apparatus may be used in any environment where detecting angular motion is desirable. In particular, vibratory gyroscope apparatus capable of detecting angular motion along three orthogonal axes may be desirable where there is a need minimal electronics or compatibility with low-noise environment.

The proof mass 110 is a resonating body member comprising silicon material and may further comprises, consist or, or consist essentially of a top surface 111 and a plurality of side surfaces. The proof mass's 110 top surface 111 is readily shown in FIG. 1 as the square-shaped face. Each of the plurality of side surfaces are substantially perpendicular to the top surface 111 and each may be coupled to a plurality of comb capacitors 120. The proof mass 110 may have a rectangular shape, but possible geometries also include a circular shape or a polygon with at least two symmetric axis, such as substantially pentagonal, hexagonal, or octagonal. In all of these geometries, additional components, which may include a spring suspension and electrodes, enable the proof mass 110 to move in at least two orthogonal directions. FIG. 1 shows an embodiment of a multi-mode, MEMS-based Coriolis vibratory gyroscope 100 capable of motion in three orthogonal directions, illustrated as the X, Y, and Z. Additionally, the proof mass 110 may comprise a uniform or perforated construction. As shown in FIG. 1, the proof mass 110 is perforated, which, among other things, reduces the sensitivity of the device due to its reduced mass and capacitance area.

Moreover, the proof mass 110 may be electrically coupled to a transducer and configured to resonate with an applied drive signal. In one embodiment, the proof mass 110 is actuated by applying a periodic signal called the resonant frequency. The resonating proof mass 110 enables the MEMS-based gyroscope to leverage the Coriolis Effect for accurate inertial measurements. When the drive mode 10 is held to a constant amplitude below the onset of non-linearity, the proof mass 110 may be monitored for changes in vibration (measured in amperes) and converted into sensor orientation data. Accordingly, the resonance frequency of the proof mass 110 operates within certain bandwidth. Proof mass 110 is driven at a bandwidth determined by the sensor size, structure, and environmental conditions and generally operates within a range of 5% to 25%. A drive frequency that is too low will be disturbed by environmental vibration. In one embodiment, an operational range for the drive frequency is 5 kilohertz and 25 kilohertz. In another embodiment, drive frequency is about 10 kilohertz.

Furthermore, the proof mass 110 may be monitored for sensor orientation information in a first sense mode. The MEMS-based vibratory gyroscope 100 disclosed herein utilizes sense modes for each orthogonal direction in which it measures linear acceleration or angular inertia. The first sense mode monitors for vibration parallel to the drive mode 10 (denoted as the Z-axis in FIG. 1). The first sense mode may function by any means capable of detecting the small vibrations. For example, in one embodiment the first sense mode may utilize by a capacitor plate situated parallel to the proof mass 110. In another embodiment, the sense mode may operate optically, for example, via a laser Doppler vibrometer.

The plurality of comb capacitors 120 comprising, consisting of, or consisting essentially of silicon may be coupled to the proof mass 110 on each of its plurality of sides. The plurality of comb capacitors 120 provide additional sense modes perpendicular drive direction to detect inertial changes in angular rate and linear acceleration. As planar inter-digitated structures, comb capacitors 120 are well suited for sensitive and accurate capacitance measurement. Instead of experiencing non-linear capacitive force over gap distance, the interlocking comb fingers 120 linearize capacitive force based on the overlapping area. By measuring capacitance, one can derive a sense metric, which is a measurement that indicates an inertial force acting on the vibratory gyroscope. For example, a comb capacitor 120 experiences an inertial force that creates a change in a stabilized controlled signal. The change, measured in amperes, may then be extrapolated to sensor orientation information related to the inertial force experienced by the sensor. Each comb capacitor 120, and possibly a capacitor coupled to the proof mass 110 may provide sensor orientation information and may be called a sense mode.

As shown in FIG. 1, each comb capacitor 120 is coupled to a side of the proof mass 110 and may be electrically coupled to control electronics that regulate signal properties, which may include amplitude and frequency. The control electronics provide a control signal to each of the plurality of comb capacitors 120. The control signal may be configured to hold each sense mode constant, using automatic gain control, to null out any vibration. Moreover, each of the sense-modes may operate at a frequency that is mode-matched to the drive frequency.

In FIG. 1, the vibratory gyroscope 100 has three sense modes for movement in the X, Y, and Z directions, respectively. Each sense modes is regulated by a control signal to null out any vibration and hold a zero amplitude. The control signal may then, simultaneously, be monitored for any changes in amplitude. Variations in amplitude indicate a change in angular rate or linear acceleration. As a result, rotation rates may be numerically integrated as function of time in order to obtain the orientation of the sensor. As discussed previously, each sense mode may be operated at a mode-matched frequency to the drive signal. By matching frequencies, there are benefits including improved noise performance and improved detection of angular inertia. As discussed previously, these advantageous are useful for navigation solutions as applied to dead reckoning navigation, or targeting applications.

The plurality of serpentine springs 130 comprise, consist of, or consist essentially of a silicon material and may be coupled to the proof mass 110 to enable its translational motion. The serpentine springs 130 enable motion translation motion of the proof mass 110 in at least two orthogonal directions. Suspension utilizing serpentine springs 130 is beneficial because it relieves nonlinear extensions in the springs during deflection and improves consistency over time. As shown in FIG. 1, serpentine springs 130 enable translational motion of the proof mass 110 in three directions along the X, Y, and Z axes. Four springs are utilized to move the proof mass 110 in this example. Furthermore, each serpentine spring may be tuned to adjust for various sources of error, including manufacturing defects or deformation over time. The tuning may be performed at the outset, during manufacturing, or as ongoing maintenance.

The plurality of anchors 140 comprise a silicon material and may couple the plurality of comb capacitors 120 to a side surface of the proof mass 110. The number of anchors in a vibrating gyroscope, as described herein, is at least as many to support each of the plurality of comb capacitors. As seen in FIG. 1, one embodiment comprises four anchors at each of the corners of the proof mass so as to hold each of the four comb capacitors 130.

Figure 2:
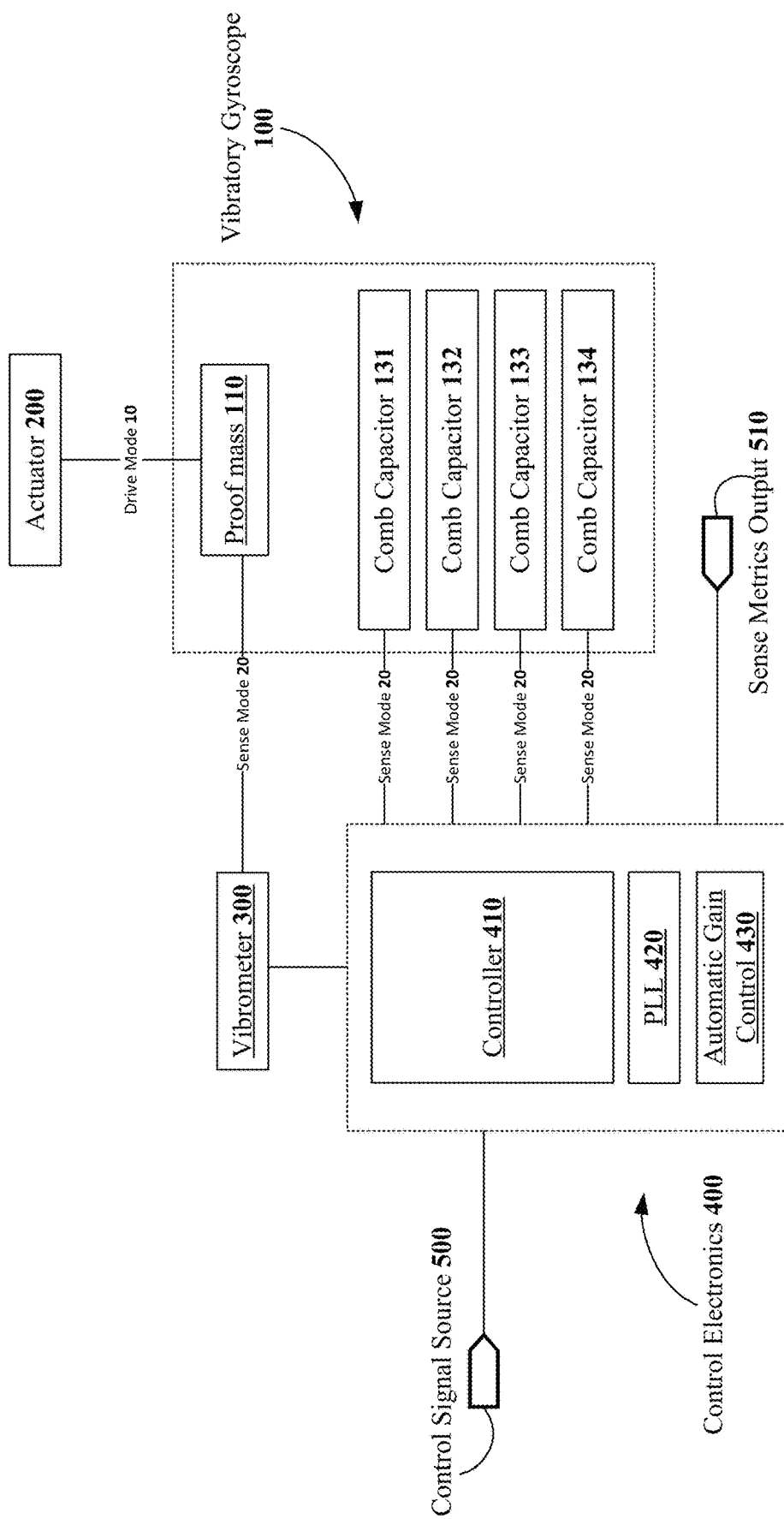
FIG. 2 is a block-diagram illustration of microelectromechanical sensor system.

FIG. 2 is an electrical diagram of a microelectromechanical sensor system comprising, consisting of, or consisting essentially of a MEMS-based vibratory gyroscope 100, an actuator 200, a vibrometer 300, and control electronics 400 further comprising a controller 410, a phase lock loop (PLL) 420, and an automatic gain control (AGC) 430. The actuator 200 provides a drive mode 10 and each of the plurality of comb capacitors provide a sense mode 20. Additionally, the microelectromechanical sensor system may include a control signal source 500 and sense metric output 510. The microelectromechanical sensor system may be used in any environment where inertial motion information may be collected. This may involve the microelectromechanical sensor system be coupled to or adjoined with a platform or device in need of monitoring. The actuator 200 provides a drive signal via the drive mode 10 to the proof mass 110 at a resonant mode-matched frequency. The drive signal is periodic and is a mode-matched frequency to the plurality of sense modes 20. The vibrometer 300 detects amplitude vibrational changes in the proof mass 110. In one embodiment, the vibrometer 300 is a parallel plate capacitor. In another embodiment, the vibrometer 300 is a Laser Doppler vibrometer.

The gyroscope controller 410 is configured to receive, monitor, determine a sense metric, and/or adjust the control signal for a plurality of sense modes 20 and is electrically connected to the vibrometer 300 and plurality of comb capacitors 120. Each sense mode 20 is associated with at least one comb capacitor 120 that monitors for movement about a particular orthogonal axis. Moreover, each sense mode 20 provides a sense metric which, in one embodiment, is the amplitude of vibration. Control signals may need to be periodically adjusted or recalibrated to properly detect vibrational changes. The gyroscope controller 410 may be a generic controller component with the capabilities described herein. Additionally, the PLL 420 is electrically connected to the controller 410 and may stabilize the control signal at the mode-matched frequency. The PLL 420 may be a generic phase lock loop component with the capabilities described herein. Additionally, the AGC 430 may be electrically connected to the controller 410 and may hold the amplitude of the control signal(s) constant. The AGC 430 may be a generic automatic gain controller component with the capabilities described herein.

FIGS. 3, 4, 5A, 5B, and 6 are snapshot simulations of a vibratory gyroscope 100 subject to various inertial forces while driven at a frequency of approximately 10 kilohertz. The measurements shown are taken continuously, so that inertial movements and forces can be tracked as a function of time. These simulations are representative of one embodiment of the disclosure herein, but is not limited structure, elements, or responses shown.

Figure 3:
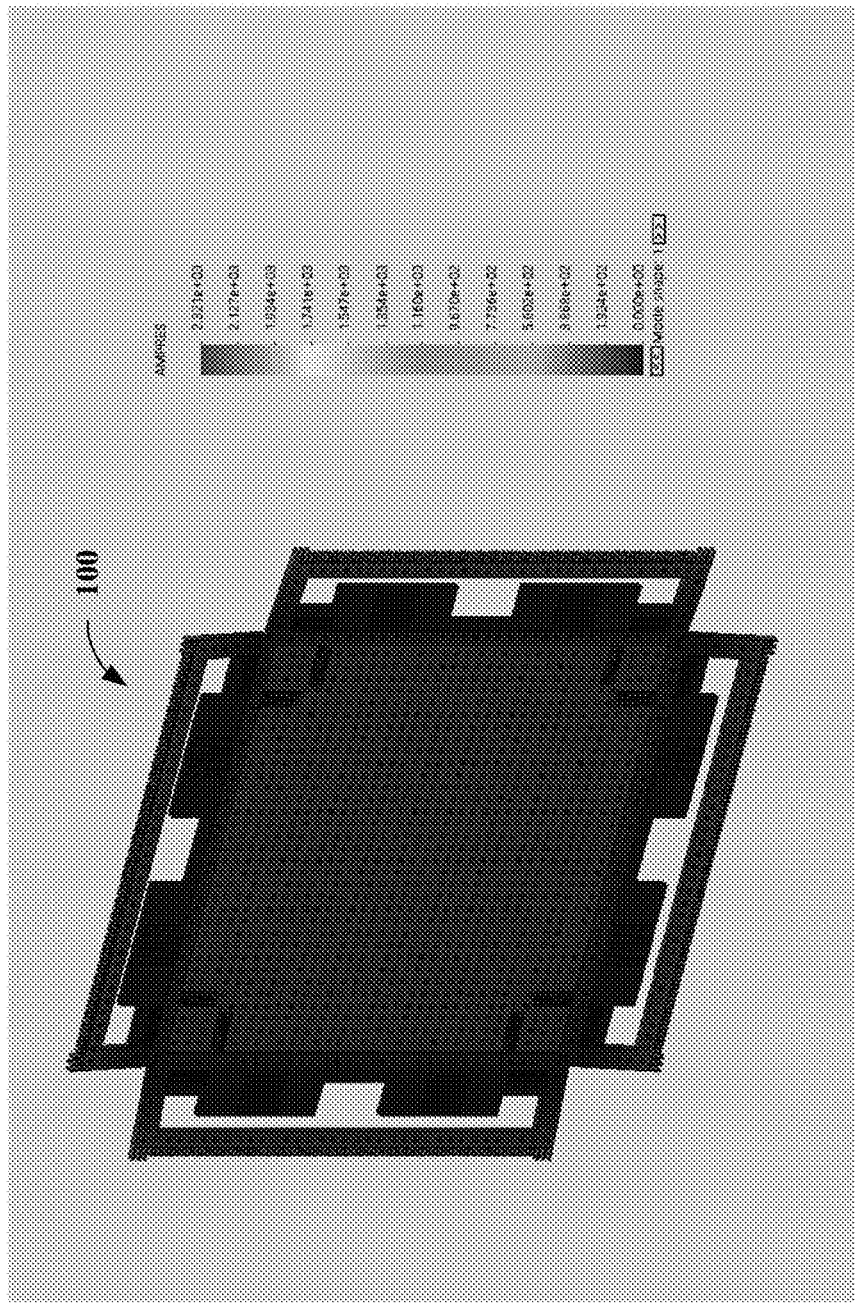
FIG. 3 is an analysis of a static vibratory gyroscope apparatus undergoing no angular inertia.

FIG. 3 is an analysis of a static vibratory gyroscope apparatus 100 in which no angular inertia is applied. The in-plane and out-of-plane sense metrics, measured in amperes and regulated by the control electronics, is null. Accordingly, no change in vibration, which may be extrapolated to inertia movement, has been detected.

Figure 4:
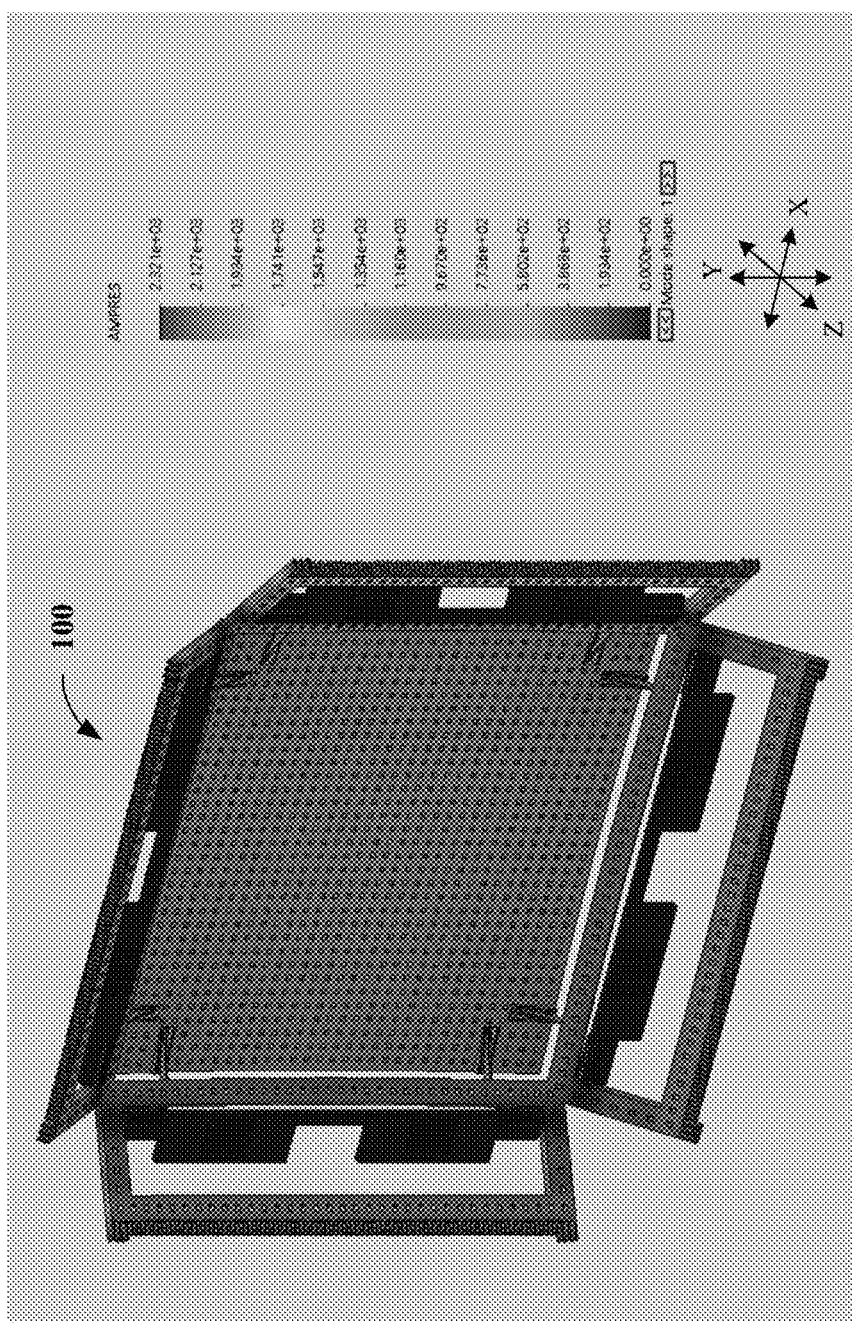
FIG. 4 is an out-of-plane analysis of a vibratory gyroscope apparatus reacting to inertia in the out-of-plane direction.

FIG. 4 is an analysis of a vibratory gyroscope apparatus 100 reacting to motion in the out-of-plane (Z) direction. As shown, the registered sense metric (amperes) is uniform across the plurality of comb capacitors 120. Additionally, the proof mass 110 provides a similarly uniform sense metric across its face. Each comb capacitor 120 and the proof mass 110 utilize a sense modes to provide sense metrics that can be used to calculate sensor orientation. Here, the sense metrics would allow one to calculate corresponding inertial force in the z-direction.

Figure 5A:
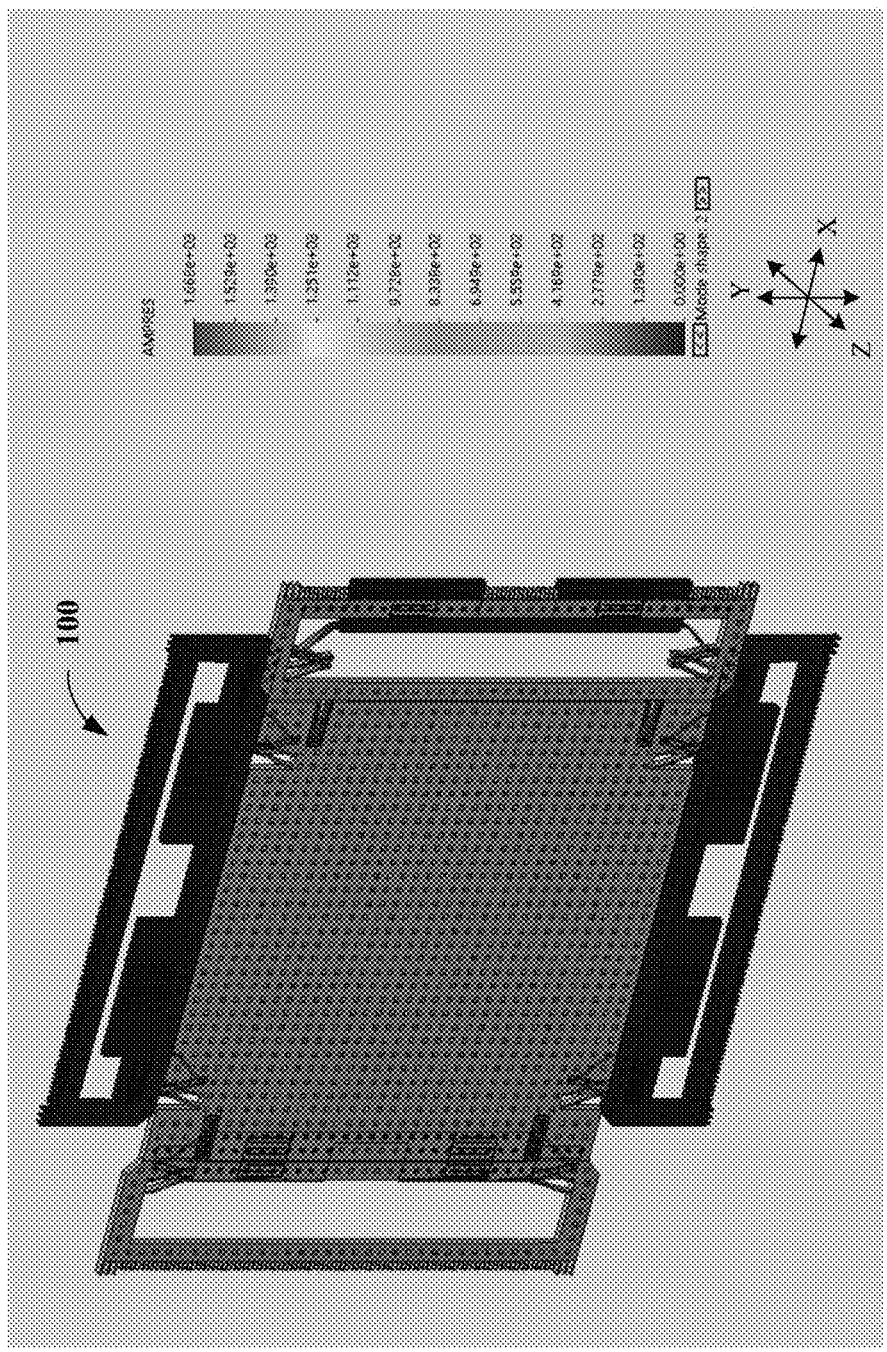
FIG. 5A is an in-plane analysis of a vibratory gyroscope apparatus reacting to inertial in the in-plane direction.

FIG. 5A is an analysis of a vibratory gyroscope apparatus 100 reacting to in-plane motion in the X direction. Here, the proof mass 110 has undergone uniform translational motion to the left (−X direction) and produced a uniform ampere distribution along its face. Additionally, the comb capacitors 120 have detected the motion and produce a sense metric as a response to the change in vibration. The comb capacitors at the top and bottom of the image are being held to a zero amperage output while they undergo no inertial forces.

Figure 5B:
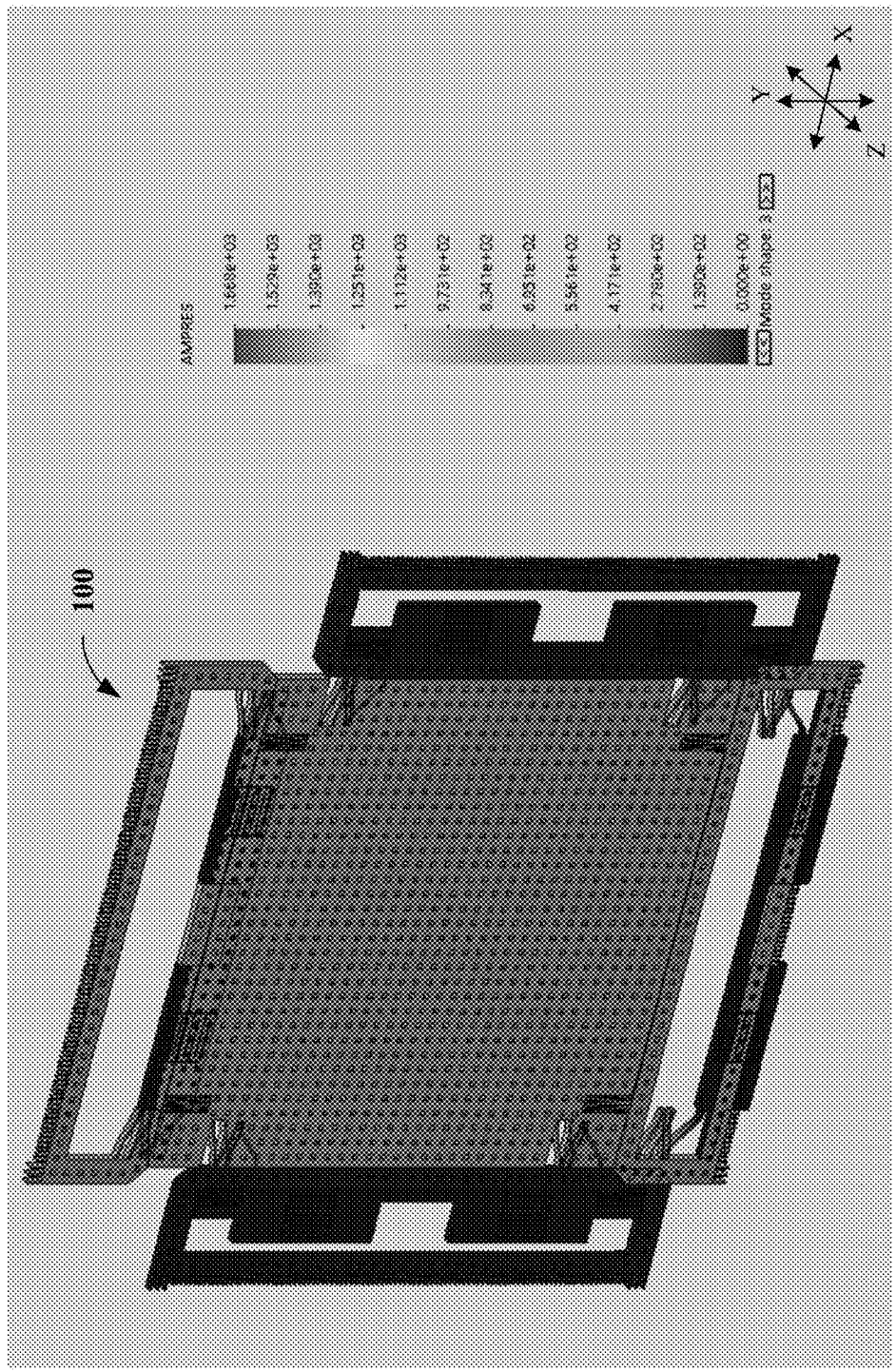
FIG. 5B is an in-plane analysis of a vibratory gyroscope reacting to inertial in a second in-plane direction.

FIG. 5B is an analysis of a vibratory gyroscope apparatus 100 reacting to in-plane motion in the Y direction. Here, the proof mass has undergone uniform translational motion upward and produced a uniform ampere distribution along the comb capacitors 120 that have translated with the proof mass.

Figure 6:
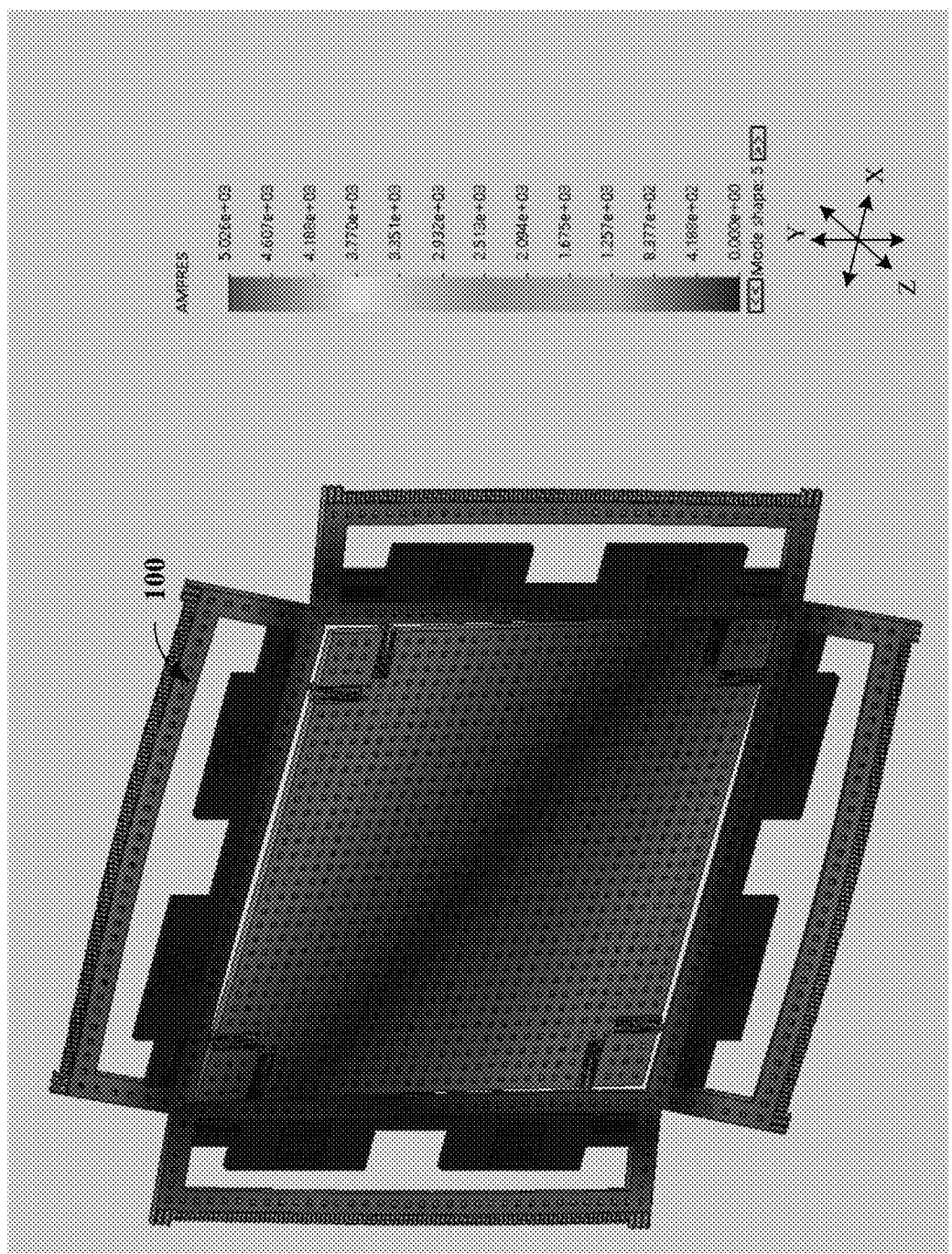
FIG. 6 is a twist analysis of a vibratory gyroscope apparatus reacting to a twist motion from rotational inertia.

FIG. 6 is a twist analysis of a vibratory gyroscope apparatus 100 reacting to a twist motion comprising rotational inertial motion. In this instance, the four comb capacitors 120 detect a gradient of amperes along all axes.

FIG. 7 is a method of collecting inertial sensor information 70 comprising the step of providing a vibratory gyroscope, further comprising a resonating proof mass having a top surface and a plurality of side surfaces substantially perpendicular to the top surface, wherein the proof mass is configured to facilitate in-plane motion at a mode-matched frequency; a plurality of comb capacitors, each coupled to one of the plurality of side surfaces, and configured to provide an in-plane sense metric while operating at the mode-matched frequency; and a plurality of serpentine springs configured to facilitate translational motion of the proof mass in directions substantially perpendicular to the top surface; driving the proof mass with a mode-matched drive signal in a first orthogonal direction; supplying the plurality of comb capacitors and the proof mass with a mode-matched control signal; monitoring a vibrometer for vibration in the proof mass; monitoring the plurality of comb capacitors for changes in vibration; determining a inertial rotation rates by integrating the sense metric over time; calculating sensor orientation in three orthogonal directions.

Moreover, a method of collecting inertial sensor information 70 may also include a method of collecting inertial sensor information wherein the proof mass is a substantially square shape having four side surfaces, and wherein the plurality of comb capacitors are a quantity of four. Additionally a method of collecting inertial sensor information may also include the proof mass is a substantially circular shape. Additionally a method of collecting inertial sensor information may also include the vibratory gyroscope further comprises a plurality of anchors configured to couple each of the plurality of comb capacitors to each of the plurality of side surfaces. Additionally, a method of collecting inertial sensor information wherein the vibratory gyroscope further comprises a capacitance plate parallel to the top surface configured to measure the capacitance of the proof mass. Additionally, a method of collecting inertial sensor information wherein the vibratory gyroscope further comprises a laser Doppler vibrometer configured to measure vibration of the proof mass. Additionally, wherein the proof resonates in a first orthogonal direction and is configured to translate in a second orthogonal direction and a third orthogonal direction.

From the above description of multi-mode, mode-matched, mems-based Coriolis vibratory gyroscope, it is manifest that various techniques may be used for implementing the concepts of vibratory gyroscope apparatus, a microelectromechanical sensor system, and a method of collecting inertial sensor information without departing from the scope of the claims. The described embodiments are to be considered in all respects as illustrative and not restrictive. The system, method, and apparatus disclosed herein may be practiced in the absence of any element that is not specifically claimed and/or disclosed herein. It should also be understood that a vibratory gyroscope apparatus, a microelectromechanical sensor system, and a method of collecting inertial sensor information are not limited to the particular embodiments described herein, but is capable of many embodiments without departing from the scope of the claims.

What is claimed:

1. A microelectromechanical sensor system, comprising:
a vibratory gyroscope apparatus, further comprising:
a resonating proof mass having a top surface and a plurality of side surfaces substantially perpendicular to the top surface, wherein the proof mass is configured to facilitate in-plane motion at a mode-matched frequency, wherein the proof mass is a substantially square shape having four side surfaces; and four comb capacitors,
each coupled to one of the four side surfaces, and configured to provide an in-plane sense metric while operating at the mode-matched frequency,
a plurality of serpentine springs configured to facilitate translational motion of the proof mass in directions substantially perpendicular to the top surface;
a gyroscope controller configured to receive, measure, and adjust the control signal for at least two orthogonal sense modes, wherein the vibratory gyroscope apparatus is configured to simultaneously operate in the at least two orthogonal sense modes while maintaining mode-matching across a plurality of sense modes;
an actuator electrically coupled to the proof mass configured to apply a periodic oscillatory signal;
a plurality of electrodes each electrically coupled to each of the plurality of comb capacitors;
a laser Doppler vibrometer configured to optically determine vibration amplitude of the proof mass and provide an out-of-plane sense metric;
a phase locked loop configured to fix the mode-matched frequency; and
an automatic gain control configured to hold the mode-matched frequency constant.

* * * * *